United States Patent
Xiong

(10) Patent No.: US 7,362,455 B2
(45) Date of Patent: Apr. 22, 2008

(54) PROCESSING SCANNED PAGES

(75) Inventor: Yan Xiong, Sunnyvale, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1101 days.

(21) Appl. No.: 10/325,422

(22) Filed: Dec. 19, 2002

(65) Prior Publication Data

US 2004/0119998 A1   Jun. 24, 2004

(51) Int. Cl.
*G06F 15/00* (2006.01)
*G06K 9/00* (2006.01)

(52) U.S. Cl. .................. 358/1.13; 358/538; 358/505; 358/522; 358/506; 358/408; 358/474; 358/486; 358/487; 358/489; 358/491; 358/496; 382/193; 382/318; 382/319; 382/131

(58) Field of Classification Search ............... 358/1.13, 358/538, 1.17, 522, 505, 506, 408, 474, 486, 358/487, 489, 491, 496, 497; 382/168, 180, 382/282, 318, 319, 131; 399/160, 183
See application file for complete search history.

(56) References Cited

U.S. PATENT DOCUMENTS

| | | | |
|---|---|---|---|
| 5,185,821 A | | 2/1993 | Yoda |
| 5,276,628 A | | 1/1994 | Schneiderhan |
| 5,390,259 A | * | 2/1995 | Withgott et al. ............ 382/173 |
| 5,621,815 A | * | 4/1997 | Talukdar et al. ............ 382/159 |
| 5,987,170 A | * | 11/1999 | Yamamoto et al. ......... 382/170 |
| 5,987,176 A | * | 11/1999 | Imaizumi et al. ........... 382/232 |
| 6,466,336 B1 | * | 10/2002 | Sturgeon et al. ............ 358/444 |
| 6,735,335 B1 | * | 5/2004 | Liu et al. .................... 382/218 |

* cited by examiner

*Primary Examiner*—King Y. Poon
*Assistant Examiner*—S. Kau

(57) ABSTRACT

Systems and methods of processing scanned pages are described. In one aspect, the invention features a method of processing a sequence of scanned pages of a document in accordance with which, page number indicators are extracted from scanned pages of the document. A histogram of extracted page number indicators is computed. Scanned page sequence information is determined based at least in part on the computed histogram. A computer program and a system for implementing the scanned page processing method also are described.

25 Claims, 3 Drawing Sheets

PROCESSING SCANNED PAGES

TECHNICAL FIELD

This invention relates to systems and methods of processing scanned pages.

BACKGROUND

Recently, digital image scanners are being used in many document handling and production tasks, including storing documents, transmitting documents (e.g., by electronic mail or by facsimile), and copying documents. Digital image scanners are available in a wide variety of different formats, including hand-held scanners and flatbed scanners. In operation, pages to be scanned are placed on a scanning surface of a digital image scanner. The pages may be placed on the scanning surface manually by an operator or automatically by an automatic document feeder that is operable to sequentially draw pages from a stack over the scanning surface. Some digital image scanners also include an automatic collator for automatically scanning two-sided pages.

Difficulties in post-scanning handling and processing operations may arise if the integrity of an original document is not preserved in the scanned document. For example, an automatic document feeder occasionally may draw two or more sheets over the scanning surface at the same time, resulting in missing pages in the scanned document. In addition, scanning operators that manually scan pages of a document may intentionally skip blank pages that may appear, for example, in a book, journal, or other publication. The resulting missing blank pages may cause problems when the scanned document is later reproduced in hard copy. For example, missing blank pages may result in incorrect page number placement and inconsistent gutter sizes in hard copies produced from scanned versions of bound documents in which the page number locations and gutter sizes are different for alternate (e.g., left and right) pages.

SUMMARY

The invention features systems and methods of processing scanned pages.

In one aspect, the invention features a method of processing a sequence of scanned pages of a document. In accordance with this inventive method, page number indicators are extracted from scanned pages of the document. A histogram of extracted page number indicators is computed. Scanned page sequence information is determined based at least in part on the computed histogram.

The invention also features a computer program and a system for implementing the above-described scanned page processing method.

Other features and advantages of the invention will become apparent from the following description, including the drawings and the claims.

DETAILED DESCRIPTION

In the following description, like reference numbers are used to identify like elements. Furthermore, the drawings are intended to illustrate major features of exemplary embodiments in a diagrammatic manner. The drawings are not intended to depict every feature of actual embodiments nor relative dimensions of the depicted elements, and are not drawn to scale.

I. System Overview

Figure 1:
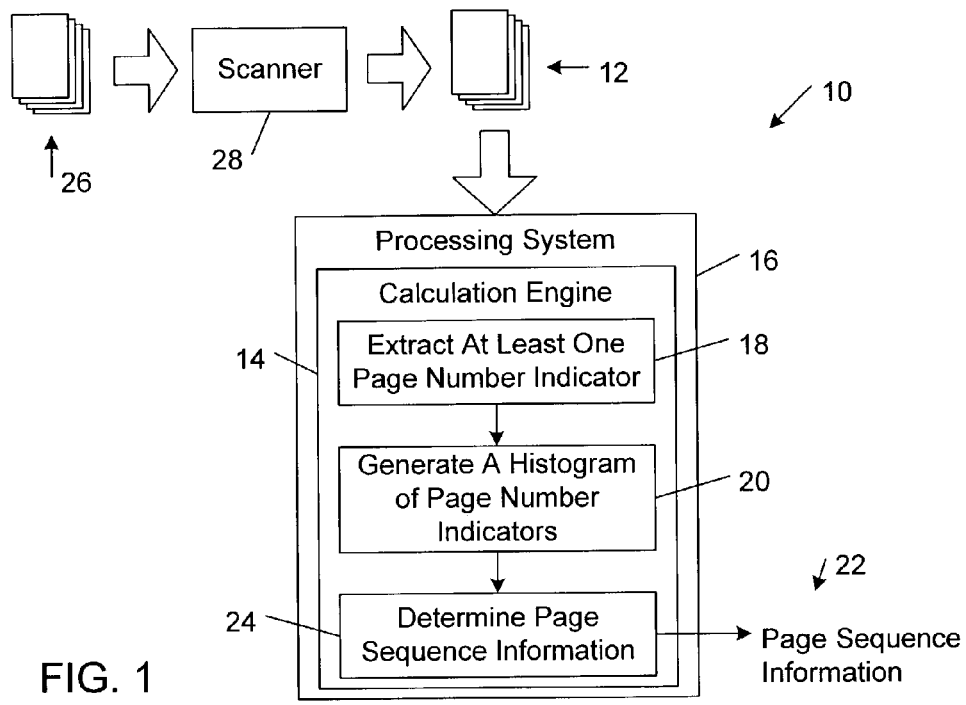
FIG. 1 is diagrammatic view of an embodiment of a system for processing a sequence of scanned pages of a document.

Referring to FIG. 1, in some embodiments, a system 10 for processing a sequence of scanned pages 12 includes a calculation engine 14 that is executable on a processing system 16. Calculation engine 14 is operable to extract at least one page number indicator from the scanned pages 12 (step 18). Calculation engine 14 is further operable to compute a histogram of extracted page number indicators (step 20). Calculation engine 14 is operable to determine page sequence information 22 based at least in part on the computed histogram (step 24). In some implementations, the page sequence information 22 relates to the integrity of the scanned page sequence (e.g., whether there are missing pages, or missing blank pages, or both). In other implementations, the page sequence information relates to sequence indicators (e.g., actual page numbers) that are extracted from the scanned pages 12. In some embodiments, scanned page processing system 10 also includes an optical character recognition engine that is operable to recognize numerical strings (or words) and other text within scanned pages 12.

In some embodiments, processing system 16 is implemented as a computer (or workstation) and calculation engine 14 is implemented as one or more software modules that are executable on a computer (or workstation). In general, a computer (or workstation) on which calculation engine 14 may execute includes a processing unit, a system memory, and a system bus that couples the processing unit to the various components of the computer. The processing unit may include one or more processors, each of which may be in the form of any one of various commercially available processors. The system memory typically includes a read only memory (ROM) that stores a basic input/output system (BIOS) that contains start-up routines for the computer, and a random access memory (RAM). The system bus may be a memory bus, a peripheral bus or a local bus, and may be compatible with any of a variety of bus protocols, including PCI, VESA, Microchannel, ISA, and EISA. The computer also may include a hard drive, a floppy drive, and CD ROM drive that are connected to the system bus by respective interfaces. The hard drive, floppy drive, and CD ROM drive contain respective computer-readable media disks that provide non-volatile or persistent storage for data, data structures and computer-executable instructions. Other computer-readable storage devices (e.g., magnetic tape drives, flash memory devices, and digital video disks) also may be used with the computer. A user may interact (e.g., enter commands or data) with the computer using a keyboard and a mouse. Other input devices (e.g., a microphone, joystick, or touch pad) also may be provided. Information may be displayed to the user on a monitor. The computer also may include peripheral output devices, such as speakers and a printer. In addition, one or more remote computers may be connected to the computer over a local area network (LAN) or a wide area network (WAN) (e.g., the Internet).

In the illustrated implementation, the sequence of scanned pages 12 is derived from a sequence of original pages 26 that is scanned by a scanner 28, which may be a conventional desktop optical scanner (e.g., a ScanJet® scanner available from Hewlett-Packard Company of Palo Alto, Calif., U.S.A.) or a portable scanner (e.g., a CapShare® portable scanner available from Hewlett-Packard Company of Palo Alto, Calif., U.S.A.). In other implementations, scanned sheets 12 may be derived from original pages 26 by a different optical device, such as a facsimile machine or a digital photocopier. The text and other markings on scanned pages 12 and original pages 26 may be color, grayscale, or black-and-white markings.

II. Determining Locations of Missing Blank Pages

Figure 2:
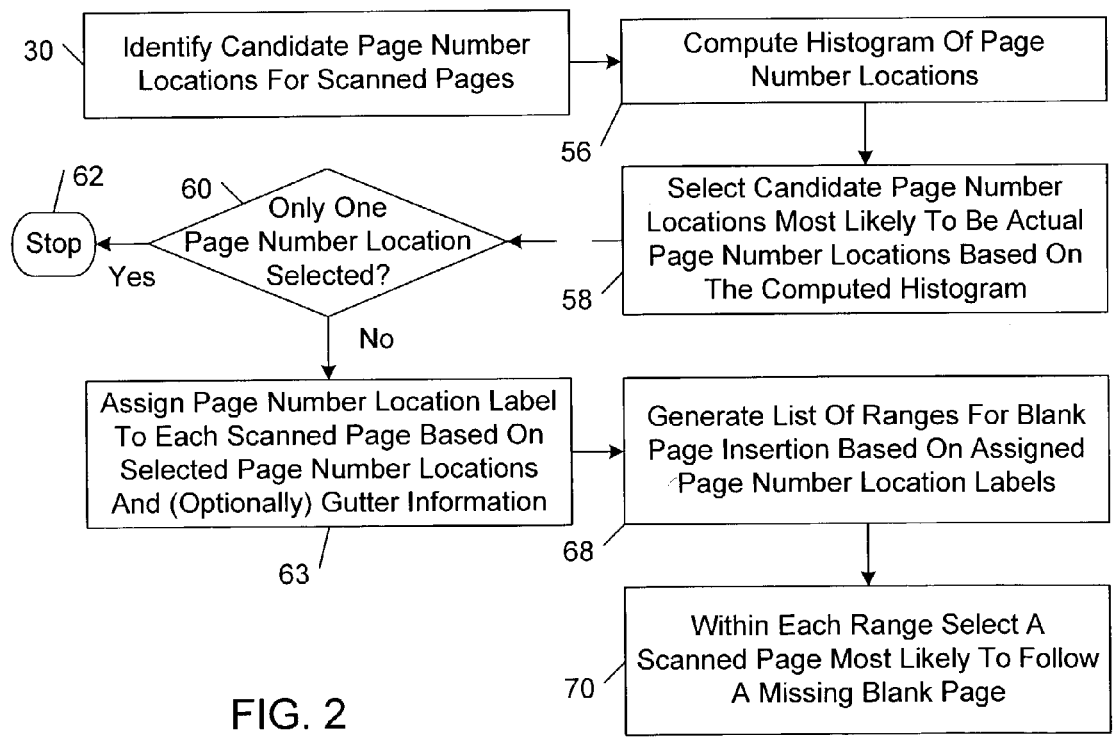
FIG. 2 is a flow diagram of an embodiment of a method of inserting missing blank pages within a sequence of scanned pages of a document.

Referring to FIG. 2, in some implementations, scanned page processing system 10 is operable to determine locations of missing blank pages in the sequence of scanned pages 12, as follows. Initially, candidate page number locations are identified for scanned pages 12 (step 30; FIG. 2). In this step, each page is divided horizontally and vertically into a number of cells. In some implementations the size of the cells is selected to tile evenly over the entirety of each scanned page and to correspond approximately to the size of a character of text. In general, the size of each cell depends on the resolution at which the pages 12 are scanned. For pages that are scanned at a resolution of 400 dots per inch (dpi), for example, the size of a cell may be 75 pixels×50 pixels.

Figure 3A:
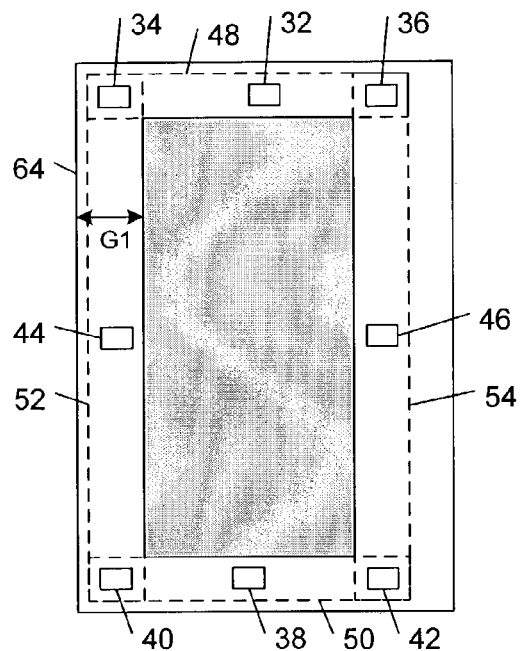
FIGS. 3A and 3B are diagrammatic front views of left and right scanned pages of a document.
Figure 3B:
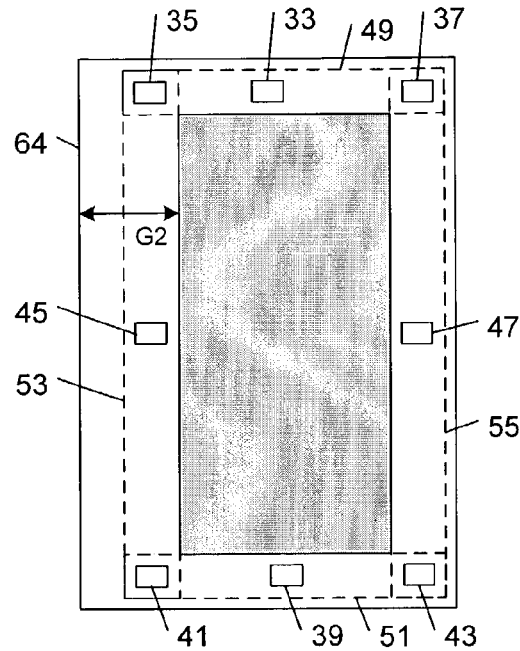

Referring to FIGS. 3A and 3B, the locations of page numbers on the scanned pages 12 may be different for different documents. For example, the page numbers may be located in the middle 32, 33 of the first line of a page, the beginning 34, 35 of the first line, the end 36, 37 of the first line, the middle 38, 39 of the last line, the beginning 40, 41 of the last line, the end 42, 43 of the last line, a left border region 44, 45 of the page or a right border region 46, 47 of the page. For this reason, page number candidates are identified in the cells in the following border regions of each page: a top border region 48, 49, a bottom border region 50, 51, a left border region 52, 53, and a right border region 54, 55. In addition, the page number locations for alternate (e.g., left and right) pages may be different within the same document, as shown in the exemplary pages 64, 66 of FIGS. 3A and 3B.

A histogram of page number candidate locations is computed across all of the scanned pages 12 as follows (step 56; FIG. 2):

$$\dim\_y = size\_y / res\_y; \dim\_x = size\_x / res\_x;$$

for (y=0; y<dim_y; y++)
for (x=0; x<dim_x; x++)histo[x][y]=0;
for (page_id=1; page_id<page_num; page_id++)
    if there is a numerical word in a border region,
        histo[y/res_y][x/res_x]++; //(x,y) is the location of the candidate.

where (size_x, size_y) specifies the size of each page and (res_x, res_y) is the size of each cell. If there are multiple page number candidates in a particular border region 48-55, the page number candidate most likely to correspond to an actual page number location is selected based upon one or more factors, including the distance between the identified page number candidate and a previous word, the distance between the identified page number candidate and a subsequent word, and the meaning connoted by the previous word.

Candidate page number locations that are mostly likely to correspond to actual page number locations are selected based on dominant peaks in the computed histogram (step 58; FIG. 2). If there is only one dominant peak, all of the page numbers are assumed to be located at the same location (e.g., the center of the top line or the center of the bottom line) on each page (step 60; FIG. 2). In this case, no blank page insertion is needed and the blank page insertion process is terminated (step 62; FIG. 2). If there are only two dominant peaks in the histogram (x0, y0) and (x1, y1), with x0<x1 and |y0-y1|≦1, then (x0, y0) is assumed to be the page number location for odd (i.e., right-hand) pages and (x1, y1) is assumed to be the page number location for even (i.e., left-hand) pages. If there are three peaks in the computed histogram, the highest peak is discarded and the two remaining smaller peaks are assumed to correspond to the page number locations for odd and even pages, as described above. In these cases, the highest peak may correspond to, for example, an issue number for a journal.

Page number location labels are assigned to each scanned page based on the selected page number locations (step 63; FIG. 2). In this step, page numbers are located for each page and stored in an array locs[page_num], as follows:

for (page_id=1; page_id≦page_num; page_id++)
    if there is numerical word located in the neighborhood of (x0, y0),
        locs[page_id]=0; //page number is on left
    else if there is a numerical word located in the neighborhood of (x1, y1),
        locs[page_id]=1//page number is on right
    else
        locs[page_id]=−1; //undetermined.

where page_num is the number of scanned pages and page_id is an identifier that is selected from a number sequence and assigned to a scanned page. There may be a numerical word located in the neighborhood of (x0, y0) and another numerical word located in the neighborhood of (x1, y1) on a given page. In this case, the page number location for the given page is selected to be the page number location that is most likely to correspond to the actual page number location is selected. The most likely page number location may be selected based on one or more factors, including the distance between the identified page number candidate and a previous word, the distance between the identified page number candidate and a subsequent word, and the meaning connoted by the previous word.

In addition, in some cases, the most likely page number location for pages having two possible page number locations may be determined based at least in part on computed gutter size information for the page. Referring back to FIGS. 3A and 3B, in some instances, the left margin sizes (G1, G2) for left and right pages 64, 66 may be different (G1<G2 in the illustrated embodiment). In this case, a histogram of left margin sizes may be computed for the sequence of scanned pages 12. Dominant peaks in the computed histogram may be used to identify two different left margin sizes (G1 and G2, with G1<G2). In this case, the gutter size information may be used to guide the assignment of page number labels for each page, as follows:

If the left margin of a page is very close to G1, but not close to G2,
locs[page_id] is more likely to be labeled 0
else if the left margin of a page is very close to G2, but not close to G1,
locs[page_id] is more likely to be labeled 1;
else
locs[page_id]=−1 //undetermined In other embodiments, a histogram of right margin sizes may be computed and used to determine two different right margin sizes, which may be sued to guide the selection of the page number locations.

After page number location labels have been assigned to the scanned pages (step 63; FIG. 2), a list of page ranges for blank page insertion is generated based on inconsistency in the sequence of assigned page location labels corresponding to the scanned page sequence across a range of consecutive pages that are assigned undetermined page location labels (i.e., locs[page_id]=−1) (step 68; FIG. 2). For example, if locs[page_id]=(0, 1, −1, −1, −1, 0, 1, 0, 1), there is no combination of 1's and 0's that could be assigned to the undetermined page locations to achieve a regular alternating sequence of 1's and 0's. In this case, a missing blank page probably should be inserted before one of the undetermined page locations. In many cases, the array locs[page_id] will contain one or more undetermined page numbers. For example, missing blank pages typically are located just before title pages, which often do not include page numbers, especially in books and journals. In addition, page numbers may be misrecognized by the optical character recognition engine used to identify numerical words in the scanned pages. In some implementations, a list of target ranges for blank page insertion may be generated as follows:

```
count = 0;
for (page_id = 1; page_id ≦ page_num; page_id + +) {
    if (locs[page_id] ! = −1) {
        if (page_id %2 ! = locs[page_id]^count {
            for (j = page_id − 1; j ≧1; j−−) {
                if locs[[j] ! = −1) break;
            }
            Add the range (page_id, i-j) to the list of ranges;
                //The meaning of the range (page_id, i-j): A blank page
                //should be inserted before one of these pages; the page
                //page_id and its previous i-j-1 pages.
            count = !count;
        }
    }
}
```

Within each target page range, a scanned page that is most likely to follow a missing blank page is selected (step 70; FIG. 2). In some embodiments, it is assumed that blank pages should be inserted before pages that are even title pages. Title pages are the pages at the start of, for example, a chapter, a table of contents page, an index page, and an acknowledge page. Title pages often have one or more of the following features:

Title pages are likely to have characteristic contents, such as "chapter", "table of contents", "index", or "acknowledgement"

The height of one of the first two lines of title pages are likely to be larger than that of most of the lines on the pages The character density on the top ¼ area of title pages is likely to be higher than the remaining area of the pages.

The page numbers are likely to be undetermined in locs[page_id].

Accordingly, in these embodiments, the insertion location pages are selected based on one or more of the following title page features that are identified in each scanned page within the target page ranges:

The content of the first two lines of the page
The height of the first two lines of the page
The number of characters in the top ¼ area of the page
Whether a page number is detected on the page
Whether the page_id of the page is odd or even after the blank page insertions A score computed based on a weighted sum of one or more of the above-identified factors may be computed for each page within each target page range to reflect whether a given page is the most likely page location before which to insert a blank page. The weights that are selected for computing the score may be determined empirically. For each target page range a blank page is inserted is before the page with the highest computed score.

III. Determining Locations of Missing Pages

Figure 4:
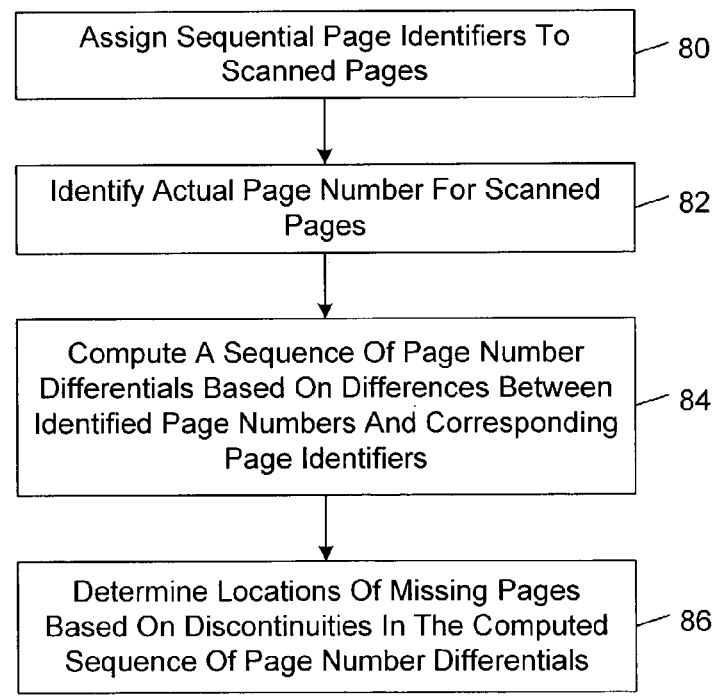
FIG. 4 is a flow diagram of an embodiment of a method of determining locations of missing pages within a sequence of scanned sheets of a document.

Referring to FIG. 4, in some implementations, scanned page processing system 10 is operable to determine locations of missing pages in the sequence of scanned pages 12, as follows.

Sequential page identifiers are assigned to the scanned pages 12 (step 80). For example, in some implementations, sequential page identifiers are assigned to the scanned pages in order, with the first scanned page being assigned a page identifier value of "1." The actual page numbers of each of the scanned pages are identified (step 82). This step is described in detail in the following section entitled "DETERMINING ACTUAL PAGE NUMBERS." A sequence of page number differentials then is computed (step 84). Each page number differential corresponds to a difference between the actual page number identified for a given scanned page and the page number assigned to the given page. Locations of missing pages are determined based on discontinuities in the computed sequence of page number differentials (step 86).

Figures 5, 6:
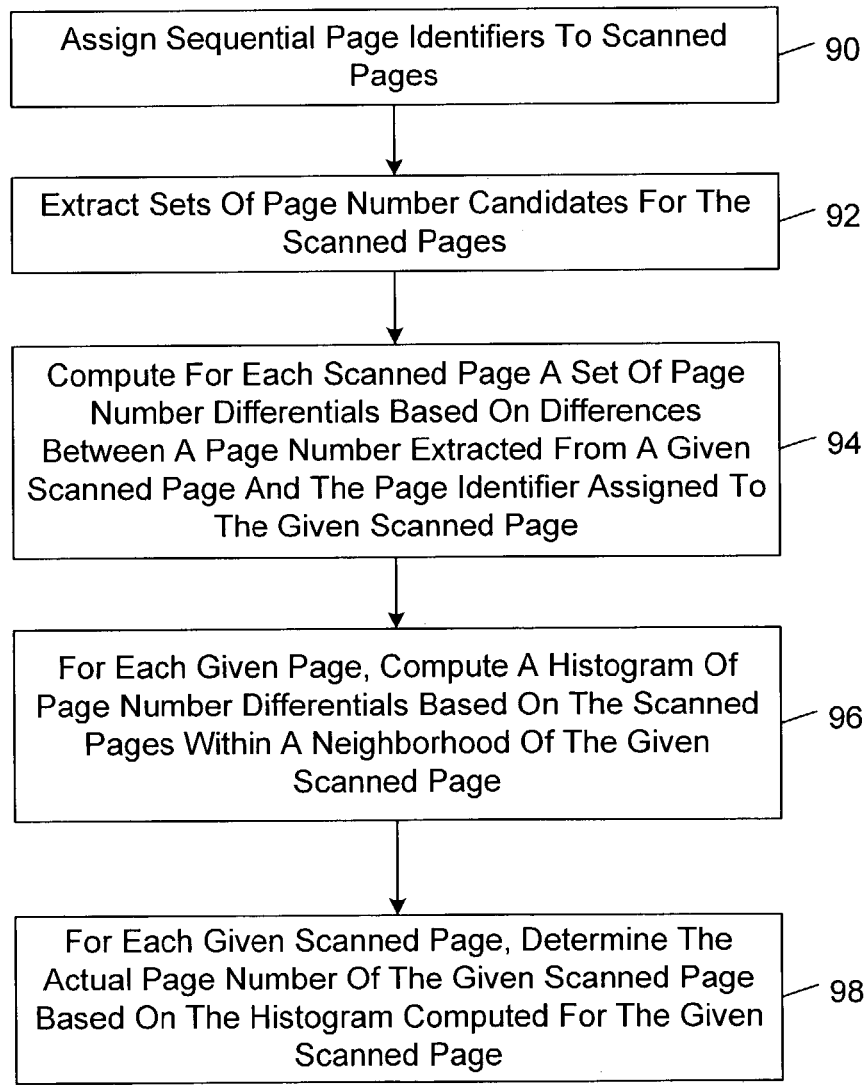
FIG. 5 is a diagrammatic view of a table of sequences of actual page numbers, assigned page identifiers, and page number differentials computed from the actual page numbers and assigned page identifiers for a sequence of scanned pages.
FIG. 6 is a flow diagram of an embodiment of a method of determining actual page numbers within a sequence of scanned sheets of a document.

As shown in FIG. 5, in one example, the page identifier that is assigned to a given page may be different from the actual page number of the given page, but the difference between the assigned page identifiers and the actual page numbers will be the same for all pages provided there are no missing pages. In the illustrated example, there is a discontinuity in the sequence of page number differentials between pages assigned page identifiers "3" and "4," indicating that a page is missing between these pages (i.e., page number "7"). In general, one or more scanned pages are determined to be missing in the neighborhood of a given page, if the page number differential computed for the given page is greater than the page number differential computed for the scanned page following the given page.

IV. Determining Actual Page Numbers

Referring to FIG. 6, in some implementations, scanned page processing system 10 is operable to determine actual page numbers of scanned pages 12, as follows.

Sequential page identifiers are assigned to the scanned pages 12 (step 90). For example, in some implementations, sequential page identifiers are assigned to the scanned pages in order, with the first scanned page being assigned a page identifier value of "1."

A set of page number candidates, s(n), is extracted for each of the scanned pages (step 92). The page number candidate set for a page n may be expressed as s(n)={s(n, i)|i=1, ..., I(n)}, where $1 \leq m \leq N$ and I(n) is the size of s(n). In one implementation, all of the numerical strings that are located on the top line of a page, the bottom line of a page, the beginning of any line of a page, and the end of any line of a page are considered as potential page number candidates. The numerical strings may be located using any known optical character recognition technique.

For each scanned page, a set of page number differentials is computed (step 94). The differentials for a page n may be expressed as d(n)={d(n, i)|i=1, ... I(n)}, where d(n, i)=s(n, i)=s(n, i)−n. That is, each page number differential corresponds to a difference between a page number candidate that is extracted from a given scanned page and the page identifier that is assigned to the given scanned page.

A histogram of page number differentials is computed for each scanned page (step 96). In some embodiments, a weighted histogram of page number differentials is computed for a given scanned page based on scanned pages within a neighborhood of the given scanned page. In one implementation, a weighted histogram d(x, i) in the neighborhood, n−w<x<n+w, of a page n is computed with the weights c(x) set as follows:

$c(x)=2$, if $x=0$, $c(x)=1$, if $-w \leq x<0$ or $0<x \leq w$.

where (2×w+1) is the length of the neighborhood.

The actual page number of a given scanned page is determined based on the weighted histogram that is computed for the given scanned page (step 98). In some embodiments, the actual page number corresponds to the page number differential with the highest frequency in the weighted histogram that is computed for a scanned page. For example, suppose w=1 and the following sets of differentials d(x) are computed for the neighborhood {n−1, n, n+1}:

$d(n-1)=\{-4, -150, -62\}$ $d(n)=\{-4, -127, -77\}$ $d(n+1)=\{-4, -66, -15\}$

In the resulting weighted histogram, the page number differential value of "−4" would have a frequency of three, whereas all of the other page number differential values would have a frequency of one. As a result, the page number differential selected for page n would be "−4." The actual page number is obtained by adding the value n (i.e., the page identifier assigned to page n) to the selected dominant page number differential value (i.e., the actual page number=−4+n).

V. Conclusion

The systems and methods described herein are not limited to any particular hardware or software configuration, but rather they may be implemented in any computing or processing environment, including in digital electronic circuitry or in computer hardware, firmware, or software.

Other embodiments are within the scope of the claims.

What is claimed is:

1. A method of processing a sequence of scanned pages of a document, comprising: extracting page number indicators from scanned pages of the document, wherein the extracting comprises identifying candidate page number locations in scanned pages of the document; computing a histogram of extracted page number indicators, wherein the computing comprises computing a histogram of the identified candidate page number locations across the sequence of scanned pages; and determining scanned page sequence information based at least in part on the computed histogram, wherein the determining comprises selecting one or more of the candidate page number locations determined to correspond to page number locations in the scanned pages based at least in part on the computed histogram of candidate page number locations.

2. The method of claim 1, wherein the identifying comprises recognizing numbers in discrete regions of the scanned pages of the document.

3. The method of claim 2, wherein the discrete regions correspond to respective cells in border regions of the scanned pages.

4. The method of claim 3, wherein the border regions correspond to one or more of a top line of page text, a bottom line of page text, a beginning portion of each line of page text, and an end portion of each line of page text.

5. The method of claim 2, wherein the identifying comprises identifying at least one of the candidate page number locations based at least in part on spacing between a recognized number and neighboring text.

6. The method of claim 2, wherein the identifying comprises identifying at least one of the candidate page number locations based at least in part on a meaning connoted by text neighboring a recognized number.

7. The method of claim 1, wherein the selecting comprises identifying one or more dominant peaks in the computed histogram of identified candidate page number locations.

8. The method of claim 7, wherein, in response to the identification of only one dominant peak in the computed histogram, the selecting comprises selecting the candidate page number location corresponding to one of the identified dominant peaks as a page number location.

9. The method of claim 7, wherein, in response to the identification of only two dominant peaks in the computed histogram, the selecting comprises selecting the two candidate page number locations corresponding to the two identified dominant peaks as page number locations for alternate scanned pages.

10. The method of claim 7, wherein, in response to the identification of three dominant peaks in the computed histogram, the selecting comprises selecting the two candidate page number locations corresponding to two smaller of the three identified dominant peaks as page number locations for alternate scanned pages.

11. The method of claim 1, wherein the selecting comprises selecting left and right ones of the candidate page number locations as output page number locations for alternate pages of the sequence of scanned pages, and further comprising determining locations of missing blank pages in the sequence of the scanned pages.

12. The method of claim 11, wherein the determining of the locations of missing blank pages comprises assigning to each scanned page a respective label indicating that the page number location of the page is one of: the left page number location; the right page number location; and undetermined.

13. The method of claim 12, wherein the determining of the locations of missing blank pages comprises identifying target page ranges for blank page insertion based on the assigned labels.

14. The method of claim 13, wherein the identifying of the target page ranges is based on inconsistency in a sequence of the alternating page location labels corresponding to the scanned page sequence across a range of consecutive ones of the scanned pages assigned labels indicating that the page number locations of the pages in the range are undetermined.

15. The method of claim 13, wherein the determining of the locations of missing blank pages comprises selecting within each of the target page ranges a respective insertion page location determined to follow a missing blank page.

16. The method of claim 15, wherein the selecting of the insertion location page comprises identifying title page features in each of the scanned pages within the target page ranges.

17. The method of claim 12, wherein the computing of the histogram of page number indicators comprises computing a histogram of margin sizes across the sequence of the scanned pages, and further comprising identifying one or more dominant peaks in the computed margin size histogram.

18. The method of claim 17, further comprising identifying in the margin size histogram a larger margin size and a smaller margin size corresponding to respective ones of the dominant peaks identified in the computed margin size histogram.

19. The method of claim 18, wherein respective ones of the labels are assigned to ones of the scanned pages based at least in part on correspondence between the margin sizes of the scanned pages and respective ones of the larger margin size and the smaller margin size.

20. The method of claim 19, wherein the assigning comprises:

assigning to ones of the scanned pages the label indicating that their page number locations are right page number locations in response to determinations that the computed left margins of these scanned page correspond to the larger margin size; and assigning to ones of the scanned pages the label indicating that their page number locations are left page number locations in response to determinations that the computed left margins of these scanned pages correspond to the smaller margin size.

21. The method of claim 1, further comprising determining locations of pages missing from the sequence of scanned pages.

22. The method of claim 21, further comprising respectively assigning to successive ones of the scanned pages in the sequence successive page identifier numbers in a number sequence.

23. The method of claim 22, further comprising determining a respective page number in each of the scanned pages.

24. The method of claim 23, further comprising computing a sequence of page number differentials each corresponding to a respective difference between the page number determined for a respective one of the scanned pages and the page identifier number assigned to that scanned page.

25. The method of claim 24, wherein the determining of the locations of missing pages is based on discontinuities in the computed sequence of page number differentials.

* * * * *